US012677896B1

(12) United States Patent

Torok

(10) Patent No.: US 12,677,896 B1

(45) Date of Patent: Jul. 14, 2026

(54) SYSTEM FOR SECURING EYEGLASSES TO A WEARER'S HEAD

(71) Applicant: Thomas Torok, Sioux Falls, SD (US)

(72) Inventor: Thomas Torok, Sioux Falls, SD (US)

(73) Assignee: Kupler Headwear, LLC, Sioux Falls, SD (US)

( * ) Notice: Subject to any disclaimer, the term of this patent is extended or adjusted under 35 U.S.C. 154(b) by 0 days.

(21) Appl. No.: 18/897,776

(22) Filed: Sep. 26, 2024

(51) Int. Cl.
*A42B 1/247* (2021.01)
*G02C 3/02* (2006.01)

(52) U.S. Cl.
CPC ............... *A42B 1/247* (2013.01); *G02C 3/02* (2013.01)

(58) Field of Classification Search
CPC .......... G02C 3/00; G02C 3/003; G02C 3/006; G02C 3/02; A42B 1/247; A42B 3/0473; A42B 1/02; A42B 1/045
See application file for complete search history.

(56) References Cited

U.S. PATENT DOCUMENTS

| | | | | | |
|---|---|---|---|---|---|
| 3,703,750 | A | * | 11/1972 | Irwin, Jr. ............... | A42B 3/185 |
| | | | | | 2/10 |
| 5,802,617 | A | * | 9/1998 | Boden ...................... | A42C 5/04 |
| | | | | | 2/181.2 |
| 5,898,472 | A | * | 4/1999 | Oshikawa ............. | G02C 3/003 |
| | | | | | 351/156 |
| 5,905,560 | A | * | 5/1999 | Daniel ................... | A42B 1/247 |
| | | | | | 2/13 |

| | | | | | |
|---|---|---|---|---|---|
| D416,665 | S | * | 11/1999 | Jones ............................ | D2/881 |
| 6,154,887 | A | * | 12/2000 | Yagi .......................... | A42B 7/00 |
| | | | | | 2/175.6 |
| 6,467,096 | B1 | * | 10/2002 | Coluccio .................. | A42B 1/22 |
| | | | | | 2/195.2 |
| 6,644,807 | B1 | * | 11/2003 | Hood ...................... | A42B 1/247 |
| | | | | | 2/10 |
| 7,013,491 | B2 | * | 3/2006 | Ferrara .................. | A42B 1/247 |
| | | | | | 2/10 |
| 7,255,436 | B2 | * | 8/2007 | Tracy ...................... | G02C 3/02 |
| | | | | | 2/209.13 |
| 7,562,977 | B1 | * | 7/2009 | Heaton .................... | G02C 3/02 |
| | | | | | 351/158 |
| 2004/0231030 | A1 | | 11/2004 | Ferrara | |
| 2006/0268221 | A1 | | 11/2006 | Tracy | |
| 2009/0056000 | A1 | * | 3/2009 | de Taboada ........... | A42B 1/247 |
| | | | | | 2/10 |

(Continued)

FOREIGN PATENT DOCUMENTS

GB 2153103 A * 8/1985 ............. G02C 11/00

*Primary Examiner* — Ephrem Z Mebrahtu

(74) *Attorney, Agent, or Firm* — Jeffrey A. Proehl; Woods, Fuller, Shultz & Smith P.C.

(57) ABSTRACT

A system for removably securing eyeglasses to a head of a person may include a cap with a pair of passages each extending along a different side of the cap. The cap may have a pair of forward apertures and a pair of rearward apertures. Each passage extends between a forward and a rearward aperture on a side of the cap. A retaining assembly for eyeglasses may include a pair of straps with each strap having a medial portion in one of the passages, a first portion extending through the forward aperture, and a second portion extending through the rearward aperture. A first end of a strap may be configured for attaching to the eyeglasses; and a second end of a strap may be attached to the second end of the other strap.

16 Claims, 4 Drawing Sheets

(56)          References Cited

U.S. PATENT DOCUMENTS

| 2011/0314580 | A1* | 12/2011 | Vach | ..................... | A42B 1/247 |
| | | | | | 2/10 |
| 2017/0027263 | A1* | 2/2017 | Yurevich | ................ | A42B 1/247 |
| 2019/0101772 | A1* | 4/2019 | Lowe | ..................... | G02C 3/02 |
| 2019/0320752 | A1 | 10/2019 | Key, Jr. | | |
| 2020/0205499 | A1 | 7/2020 | Draper | | |
| 2022/0057649 | A1 | 2/2022 | Zabel | | |
| 2023/0389644 | A1* | 12/2023 | Bain | ..................... | A42B 7/00 |

* cited by examiner

SYSTEM FOR SECURING EYEGLASSES TO A WEARER'S HEAD

BACKGROUND

Field

The present disclosure relates to eyeglasses accessories and more particularly pertains to a new system for securing eyeglasses to a wearer's head in, for example, two positions of the eyeglasses on the wearer's head such as on the wearer's face and on a cap worn by the person.

Description of the Prior Art

Some conventional practices for storing eyeglasses, and particularly sunglasses, on the person of the wearer when not being actively worn include resting the glasses on the visor of a cap without any securing of the glasses to the cap (which relies upon any friction present between the temple pieces of the glasses and the exterior surface of the cap to stay on the cap), or perhaps one of the temple pieces of the glasses through the neck hole of the user's shirt.

Numerous devices with the purpose of holding glasses not been actively used have been proposed. Some devices attempt to provide additional securing of the glasses when the glasses are rested on the visor but are significantly less effective for securing the glasses on the head of the wearer when the glasses are actively being used, if the devices attempt to provide any securing at all of glasses being worn.

SUMMARY

In one aspect, the present disclosure relates to a system for removably securing eyeglasses to a head of a person. The system may comprise a cap for being worn by the person, with the cap having a top and a bottom, a front and a rear, and opposite sides. The cap may include a crown extending from the bottom of the cap to the top of the cap, a visor extending forwardly from the crown at the front of the cap for positioning above the face of the person, and a perimeter band for extending around the head of the user when the cap is worn on the head. The cap may also include a pair of passages extending along different side portions of the perimeter band, a pair of forward apertures being formed in the crown, with each of the forward apertures being located on one of the sides of the cap and being in communication with one of the passages. The cap may further include a pair of rearward apertures formed in the crown, with each of the rearward apertures being located rearwardly of one of the forward apertures and being in communication with one of the passages such that each of the passages extends between one of the forward apertures and one of the rearward apertures on a said side of the cap. The system may also comprise a retaining assembly mounted on the cap for retaining eyeglasses on the cap. The retaining assembly may include a pair of straps with each of the straps having a medial portion extending in one of the passages of the cap, a first portion extending out of a said passage through the forward aperture of said passage, and a second portion extending out of the passage through the rearward aperture of said passage. A first end on the first portion of the strap may be configured for attaching to one of the temples of the eyeglasses and a second end on the second portion of the strap may be attached to the second end of the other said strap.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
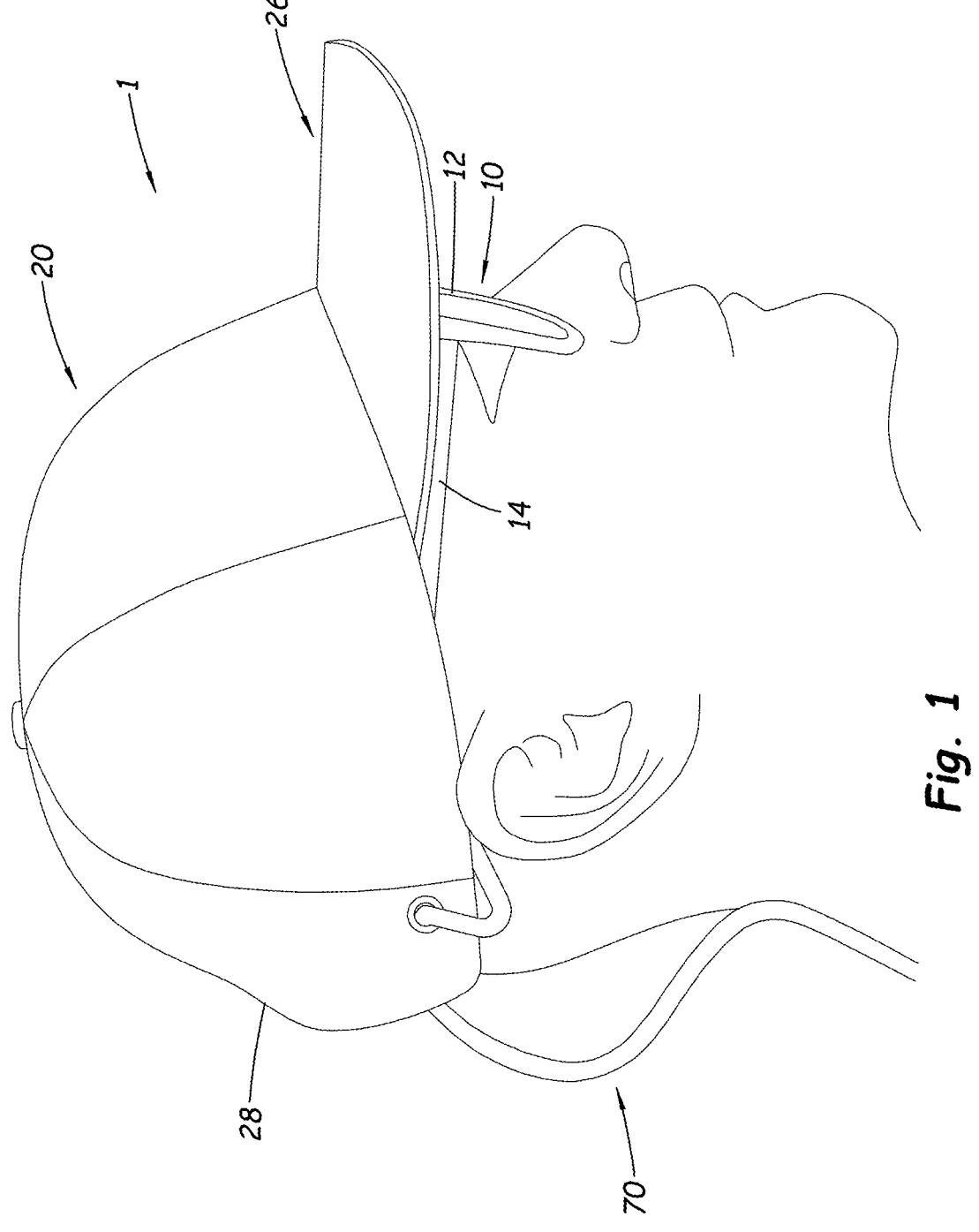
FIG. 1 is a schematic side view of a person wearing a new system for securing eyeglasses to a wearer's head, with the eyeglasses in a use position, according to the present disclosure.
Figure 2:
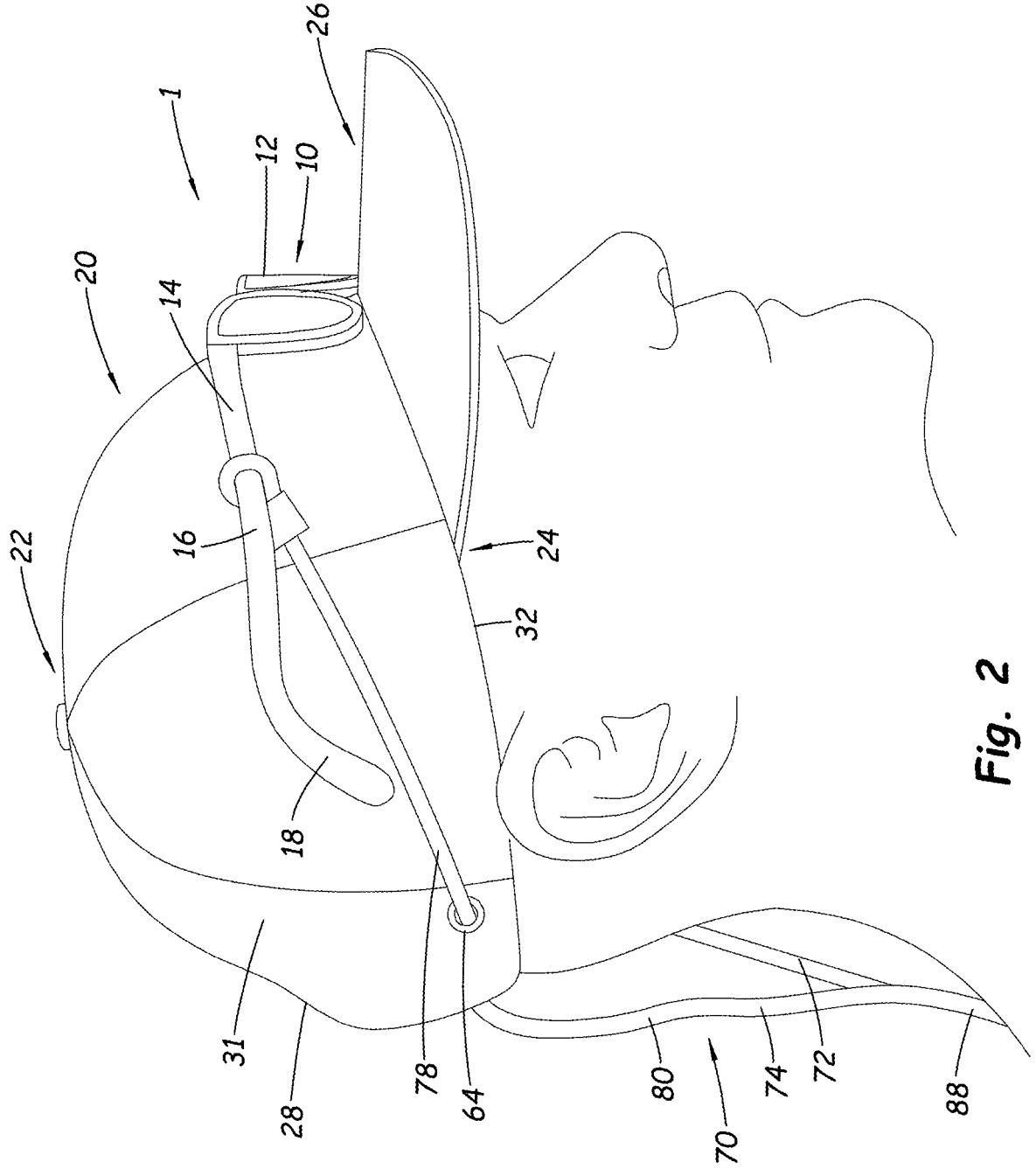
FIG. 2 is a schematic side view of a person wearing the new system for securing eyeglasses to the wearer's head, with the eyeglasses in a stored position, according to the present disclosure.
Figure 3:
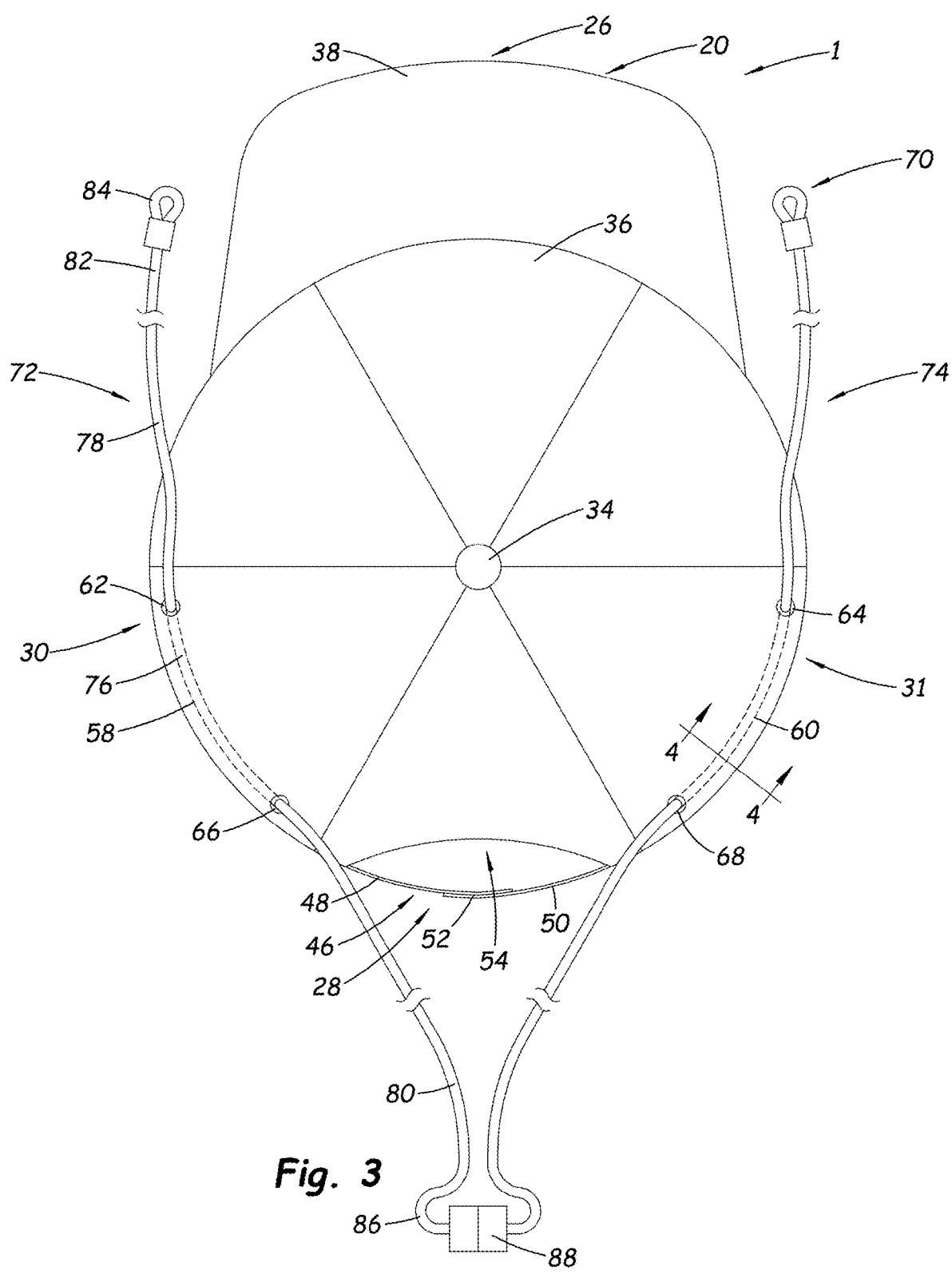
FIG. 3 is a schematic top view of the system, according to an illustrative embodiment.
Figure 4:
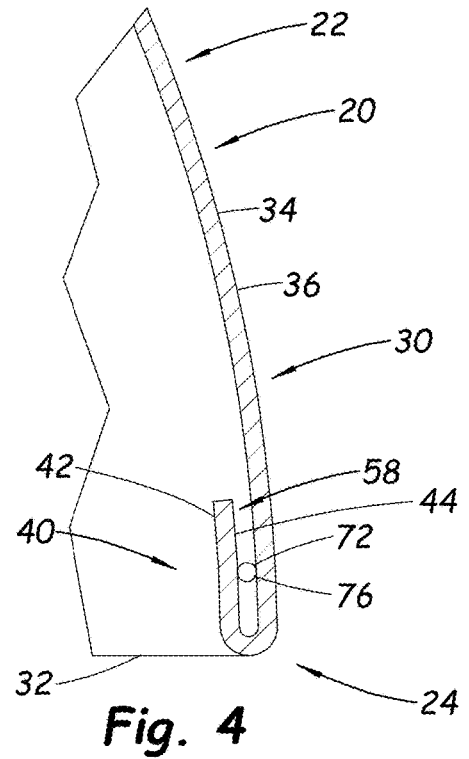
FIG. 4 is a schematic sectional view of a portion of the cap and the retaining assembly taken along line 4-4 in FIG. 3, according to an illustrative embodiment.
Figure 5:
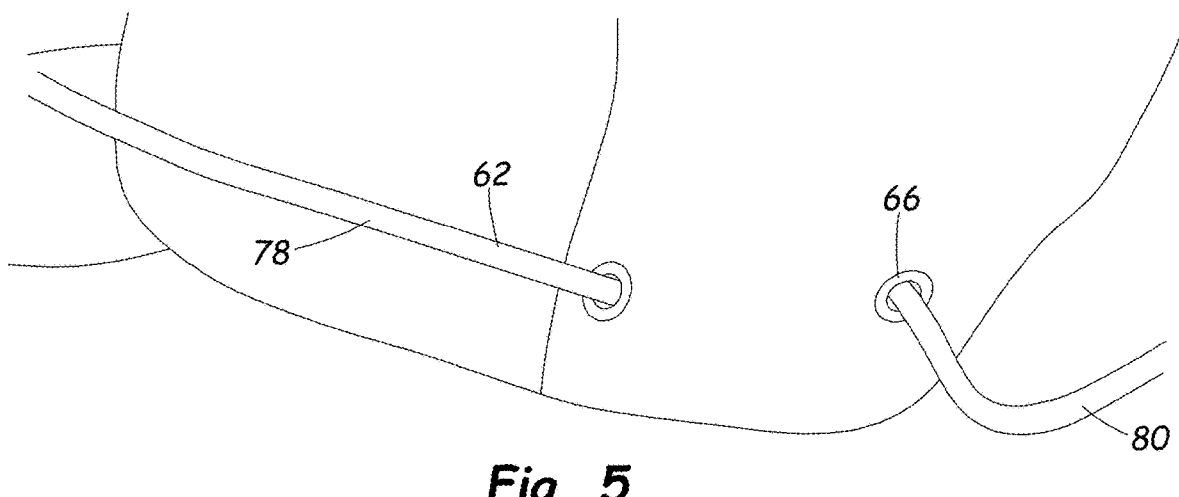
FIG. 5 is a schematic side view of a portion of the cap and the retaining assembly, according to an illustrative embodiment.

With reference now to the drawings, and in particular to FIGS. 1 through 5 thereof, a new system for securing eyeglasses to a wearer's head embodying the principles and concepts of the disclosed subject matter will be described.

Significantly, the system of the disclosure permits the glasses to be held securely to the head whether the glasses are being worn on the face of the wearer and the glasses are actively being used, or the glasses are being rested on the visor or "bill" of the cap and the glasses are not in use, but are positioned to be placed on the face of the wearer without significant effort.

Aspects of the disclosure relate to a system 1 for removably securing eyeglasses to the head of the user or wearer of the eyeglasses. Typically, the eyeglasses comprise sunglasses, although other types of glasses are also suitable for use with the system.

In some embodiments, the system 1 may include the eyeglasses 10 which comprise a front frame 12 and a pair of temple members 14, 16 that are pivotally mounted on the front frame. Each of the temple members 14, 16 may have a rear end portion 18 located opposite of the front frame. Generally, the eyeglasses 10 have a use position in which the front frame is positioned on the nose of the wearer and in front of the eyes of the wearer. The eyeglasses 10 may also have a stored position in which the front frame is positioned away from the face of the wearer and the front frame is rested on the visor of the cap.

In embodiments, the system 10 may include a cap 20 generally characterized having a top 22 and a bottom 24, a front 26 and a rear 28. The front 26 of the cap may be positioned above the face of the wearer during typical usage, and the rear 28 may be located opposite of the face on the head of the wearer. The cap 20 has opposite sides 30, 31 between the front and rear. The cap 20 also has an opening 32 at the bottom for receiving a portion of the wearer's head and has a peak at the top, opposite of the opening 32.

The cap 20 may comprise a crown 34 that extends from the bottom 24 to the top 22 of the cap and from the opening 32 to the peak of the cap. The crown 34 may be formed of a plurality of panels 36 which each may extend from the opening to the peak. The cap may also comprise a visor 38 that extends forwardly from the crown at the front of the cap so as to be positioned above the face of the wearer during usage of the cap.

The cap 20 may also comprise a perimeter band 40 that extends around the head of the user when the cap is worn on the head. The perimeter band 40 has an inward side 42 oriented toward the wearer's head and an outward side 44 oriented away from the wearer's head. The perimeter band 40 may include a closure structure 46 which is configured to adjust a circumferential size of the perimeter band to adjust the fit of the cap to the size of the wearer's head. In embodiments, the closure structure includes two band sections 48, 50 and a connector element 52 for connecting the two band sections together at different locations to affect different circumferential sizes of the perimeter band. The connecting element 52 may comprise, for example, a slide buckle or a series of posts engageable with a series of holes. The cap 20 may include a gap 54 between the crown 34 and the perimeter band 40 at the rear 28 of the cap, and the closure structure 46 may extend across the gap such that the gap accommodates constriction and extension of the closure structure 46 of the band to facilitate increasing and decreasing the circumferential size of the perimeter band.

In a significant aspect, the cap 20 includes a passage 58 extending along a portion of the perimeter band, and preferably may include a pair 58, 60 of the passages with each of the passages being located on one of the opposite sides 30, 31 of the cap. Each of the passages 58, 60 may be elongated and may extend along different portions of the perimeter band 40 on the sides of the cap. In the illustrative embodiments, the passages 58, 60 may be formed by the crown 34 and the perimeter band 40. Each of the passages 58, 60 may be located between the perimeter band and the portion of the material of the crown 34 that extends downwardly adjacent to the outward side 44 of the perimeter band.

Significantly, the cap 20 may also include a pair 62, 64 of forward apertures formed in the crown, or panels forming the crown, of the cap. Each of the forward apertures 62, 64 may be located at one of the sides 30, 31 of the cap and each of the forward apertures may be in communication with one of the passages so that each of the passages is in communication with one of the forward apertures. Conceptually, the forward apertures 62, 64 are located at the forward ends of the respective passages 58, 60. The forward apertures 62, 64 may be located adjacent to the inward side 42 of the perimeter band, generally adjacent to the lower edge of the crown forming the opening 32. Illustratively, each of the forward apertures may be located on the side of the cap at a location approximately above the position of the ear of the wearer when the cap is being work by the wearer. The forward apertures may each be located approximately halfway between the forwardmost extent of the opening 32 of the crown and the rearwardmost extent of the opening of the crown. As a further example, each of the forward apertures 62, 64 may be located slightly forward of the seam between adjacent panels of the crown located at the side 30, 31 of the cap.

Additionally, the cap 20 may further include a pair 66, 68 of rearward apertures formed in the crown, or panels forming the crown. The rearward apertures 66, 68 are generally located rearwardly of the forward apertures. Each of the rearward apertures 66, 68 may be in communication with one of the passages. Conceptually, the rearward apertures 66, 68 are located at the rearward ends of the respective passages 58, 60. The rearward apertures 66, 68 may also be located adjacent to the inward side 42 of the perimeter band, generally adjacent to the lower edge of the crown forming the opening 32. Illustratively, the rearward apertures 66, 68 may be located on opposite sides of the gap 54, and each aperture may be located adjacent to the edge of the material of the crown forming the gap.

The system 1 has a retaining assembly 70 mounted on the cap 20 for retaining the eyeglasses on the cap. The retaining assembly 70 may utilize features of the cap 20 described herein that are not typical of a cap, such as the forward and rearward apertures and the passage extending between the apertures. The retaining assembly 70 may be mounted on the cap via the passages 58, 60 of the cap. The retaining assembly 70 may be effective for securing the eyeglasses in the use position on the face of the wearer and also in the stored position on the visor of the cap.

In embodiments, the retaining assembly 70 includes a pair of straps 72, 74, with each strap being associated with one of the passages 58, 60 of the cap. In general, each of the straps is partially inserted into and located in one of the passages such that a medial portion 76 of the strap extends in one of the passages of the cap. A first portion 78 of each strap may extend from the passage into which it is inserted and out of the forward aperture associated with the passage. A second portion 80 of each strap may extend from the associated passage out of the rearward aperture of the passage. It should be recognized that each of the straps 72, 74 may comprise virtually any type of elongate member, such as a cord, tube, band, etc., whether solid or hollow.

For each of the straps, the first portion 78 has a first end 82 which is configured for attaching to one of the temples of the eyeglasses for securing the respective strap to the temple of the glasses. An attachment structure 84 may be located on the first end 82 to attach the first end to the temple of the eyeglasses. In the most highly preferred embodiments, the attachment structure 84 provides a removable attachment between the strap and the temple of the eyeglasses to permit interchange of different glasses with the retaining assembly. Illustratively, the attachment structure may comprise a loop formed on the first end 82 into which the end portion of one of the temples may be inserted. Optionally, the loop may be constricted about the temple to create the attachment, or the loop may be formed of the elastomeric material to permit stretching of the loop to insert the temple. In another example, the attachment structure 84 may be provided by the first end 82 of the strap having a tubular construction to accept an end portion of the temple. Other structures may be suitable for forming the attachment structure 84.

In some embodiments, the first ends 82 of the straps may be connectable to each other, such as when glasses are not attached to the retaining assembly, and may permit the first portion 78 and first ends 82 of the straps to rest upon the upper surface of the visor 38. In some embodiments, the attachment structure 84 on each of the first ends 82 of the straps may also be configured to attach together. For example, loops forming the attachment structure on each of the ends 82 for the temples of the glasses may also permit the ends 82 to be removably attached together.

Also, for each of the straps, the second portion 80 has a second end 84. While the second ends 84 of the respective straps may be loose with respect to each other, some preferred embodiments of the retaining structure have the second ends of the straps connected or attached together to resist unintentional movement of the second end into the rearward aperture and into the passage, and possibly out of the forward aperture such that the strap is disconnected from the cap. A breakaway structure 88 may be provided to connect the second ends of the respective straps in a manner that secures the ends together, but may also be configured to release the connection of the ends upon the application of force above a threshold level to provide a safe to release if the second portions of the connected straps were to be unintentionally caught upon a protruding object. The threshold level of force may be greater than the force that would normally be applied to the straps when adjusting the position of the straps in the passages, but may also be below the force that might injure the wearer's head or neck if not released. Illustrative breakaway structures may comprise a snap connection, a hook and loop fastener connection, and the like.

In embodiments, the straps 72, 74 and the passages 58, 60 are constructed in a manner that permits sliding of the strap through the passage to adjust a degree to which the first portions 78 of the straps extend out of the passages, and thus permits adjustment of the position of the eyeglasses attached to the straps with respect to the cap, for comfortably fitting the wearer's face or positioning the eyeglasses on the visor of the cap.

In some embodiments, the straps 72, 74 and the passages 58, 60 may be constructed in a manner that imposes a degree of resistance to the sliding of the straps through the respective passages such that the straps are held or maintained in a particular position with respect to the passage. The degree of resistance may be such that a degree of force is applied to the strap or straps by the user manually pulling on one of the portions of the straps causes the strap or straps to move through the passage. The degree of resistance to the movement of the straps through the passages may be increased or decreased by changing the material forming the strap and/or the passage, or by changing the character of the surface of the strap and/or the passage.

In some preferred embodiments, the straps 72, 74 are substantially unstretchable to substantially resist or prevent elongation of the strap between the first 82 and second 86 ends, which tends to reduce or eliminate any tension that may be applied by the straps to the eyeglasses, and in turn to the face of the wearer, when the glasses are in the use position.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A system for securing eyeglasses to a head of a person, the eyeglasses being of a type having a front frame and a pair of temple members extending from the front frame, the system comprising:

a cap for being worn by the person, the cap having a top and a bottom, a front and a rear, and opposite sides, the cap having an opening at the bottom for receiving a portion of the head of the person, the cap comprising:

a crown extending from the top of the cap to the opening at the bottom of the cap, the crown defining an outward boundary of an interior of the cap;

a visor extending forwardly from the crown at the front of the cap for positioning above the face of the person; and a perimeter band for extending around the head of the user when the cap is worn on the head, the perimeter band being located in the interior of the cap and at the bottom of the cap adjacent to the opening of the cap, the perimeter band being located inward of the crown such that the perimeter band is located between the crown and the head of the person when the cap is worn by the person, a pair of passages extending along different side portions of the perimeter band, each of the passages being formed by and being located between the inward perimeter band and the outward crown;

a pair of forward apertures formed in the crown outward of the perimeter band, each of the forward apertures being located on one of the sides of the cap and being in communication with one of the passages; and a pair of rearward apertures formed in the crown outward of the perimeter band, each of the rearward apertures being located on one of the sides of the cap and rearwardly of one of the forward apertures, each of the rearward apertures being in communication with one of the passages such that each of the passages extends between one of the forward apertures and one of the rearward apertures on a said side of the cap; and a retaining assembly mounted on the cap for retaining eyeglasses on the cap, the retaining assembly comprises:

a pair of straps with each of the straps having:

a medial portion extending in one of the passages of the cap such that the medial portion is located in the interior of the cap between the inward perimeter band and the outward crown;

a first portion extending out of a said passage through the forward aperture formed in the crown such that the first portion extends through the forward aperture and out of the interior of the cap; and a second portion extending out of the said passage through the rearward aperture formed in the crown such that the second portion extends through the rearward aperture and out of the interior of the cap;

a first end on the first portion of the strap being configured for attaching to a temple member of the eyeglasses; and a second end on the second portion of the strap being attached to the second end of the other said strap.

2. The system of claim 1 wherein the straps and the passages are constructed in a manner that permits sliding of the medial portion of the strap through the passage associated with the strap to permit adjustment of a degree to which the first portions of the straps extend out of the passages.

3. The system of claim 1 wherein the straps and the passages are constructed in a manner that imposes a degree of resistance to the sliding of the straps through the passages that permits the straps to be held in a particular position with respect to the passage.

4. The system of claim 1 wherein the straps are substantially unstretchable to substantially prevent elongation of the straps between the first and second ends of the straps.

5. The system of claim 1 wherein the second ends of the straps are releasably connected together by a breakaway device permitting disconnection of the second ends from each other upon application of force on one of the straps exceeding a threshold level of force.

6. The system of claim 1 wherein each of the forward apertures is located approximately halfway between a forwardmost extent of the crown and a rearwardmost extent of the crown.

7. The system of claim 1 wherein each of the forward apertures is located on a said side of the cap approximately halfway between the front and the rear of the cap.

8. The system of claim 6 wherein each of the rearward apertures is located rearward of a point located approximately halfway between the forwardmost extent of the crown and the rearwardmost extent of the crown.

9. The system of claim 1 wherein the cap includes a gap in the crown and in the perimeter band at the rear of the cap to facilitate constriction and extension of the closure structure of the band; and wherein the rearward apertures are located on opposite sides of the gap.

10. The system of claim 1 additionally comprising the eyeglasses, each of the temple members having a rear end portion opposite of the front frame; and wherein the first end of each of the straps is attached to one of the rear end portions of the temples.

11. The system of claim 1 wherein the perimeter band of the cap has an outward side oriented toward the crown of the cap and an inward side oriented toward the head of the person wearing the cap when the cap is being worn; and wherein the passages are formed between the outward side of the perimeter band and the crown of the cap.

12. The system of claim 1 wherein each of the passages is located outward of the perimeter band of the cap and inward of the crown of the cap.

13. The system of claim 1 wherein the crown of the cap is formed of a plurality of panels extending from the opening to the top of the cap, each of the forward and rearward apertures being positioned in one of the panels of the crown.

14. The system of claim 9 wherein the perimeter band includes a closure structure extending across the gap and being configured to adjust a circumferential size of the opening at the bottom of the cap by increasing and decreasing the circumferential size of the perimeter band.

15. A system for removably securing eyeglasses to a head of a person, the eyeglasses being of a type having a front frame and a pair of temple members extending from the front frame, the system comprising:

a cap for being worn by the person, the cap having a top and a bottom, a front and a rear, and opposite sides, the cap having an opening at the bottom for receiving a portion of the head of the person, the cap comprising:

a crown extending from the top of the cap to the opening at the bottom of the cap, the crown defining an outward boundary of an interior of the cap;

a visor extending forwardly from the crown at the front of the cap for positioning above the face of the person; and a perimeter band for extending around the head of the user when the cap is worn on the head, the perimeter band being located in the interior of the cap and at the bottom of the cap adjacent to the opening of the cap, the perimeter band being positioned inward of the crown of the cap such that the perimeter band is located between the crown and the head of the person when the cap is worn by the person;

a pair of passages extending along different side portions of the perimeter band, each of the passages being formed by and being located between the inward perimeter band and the outward crown;

a pair of forward apertures formed in the crown outward of the perimeter band, each of the forward apertures being located on one of the sides of the cap and being in communication with one of the passages; and a pair of rearward apertures formed in the crown outward of the perimeter band, each of the rearward apertures being located on one of the sides of the cap and rearwardly of one of the forward apertures, each of the rearward apertures being in communication with one of the passages such that each of the passages extends between one of the forward apertures and one of the rearward apertures on a said side of the cap; and a retaining assembly constructed with the cap for retaining eyeglasses on the cap, the retaining assembly comprises:

a pair of straps with each of the straps having:

a first end configured for attaching to a temple member of the eyeglasses;

a second end opposite of the first end and being attached to the second end of the other said strap;

a first portion of the strap extending from the first end toward the second end; and a second portion of the strap extending from the second end toward the first end;

a medial portion of the strap extending between the first and second portions;

wherein each of the straps extends through one of the passages of the cap, each said strap having:

the first portion of the strap protruding through the forward aperture and extending out of the passage associated with the strap such that the first portion extends through the forward aperture and out of the interior the cap so that the first end is positioned outside of the passage;

the second portion of the strap protruding through the forward aperture and extending out of the passage associated with the strap such that the second portion extends through the rearward aperture and out of the interior of the cap so that the second end is positioned outside of the passage; and the medial portion of the strap extending through the passage associated with the strap between the forward and rearward apertures of the passage such that the medial portion is located in the interior of the cap between the inward perimeter band and the outward crown.

16. A system for removably securing eyeglasses to a head of a person, the system comprising:

a cap for being worn by the person, the cap having a top and a bottom, a front and a rear, and opposite sides, the cap having an opening at the bottom for receiving a portion of the head of the person, the cap comprising:

a crown extending from the top of the cap to the opening at the bottom of the cap, the crown defining an outward boundary of an interior of the cap;

a visor extending forwardly from the crown at the front of the cap for positioning above the face of the person; and a perimeter band for extending around the head of the user when the cap is worn on the head, the perimeter band being located in the interior of the cap and at the bottom of the cap adjacent to the opening of the cap, the perimeter band being located inward of the crown such that the perimeter band is located between the crown and the head of the person when the cap is worn by the person;

a pair of passages extending along different side portions of the perimeter band, each of the passages being formed by and being located between the inward perimeter band and the outward crown;

a pair of forward apertures formed in the crown outward of the perimeter band, each of the forward apertures being located on one of the sides of the cap and being in communication with one of the passages, each of the forward apertures being located approximately halfway between a forwardmost extent of the crown and a rearwardmost extent of the crown and rearward of a rearwardmost extent of the visor; and a pair of rearward apertures formed in the crown outward of the perimeter band, each of the rearward apertures being located on one of the sides of the cap and rearwardly of one of the forward apertures, each of the rearward apertures being located rearward of a point located approximately halfway between the forwardmost extent of the crown and the rearwardmost extent of the crown, each of the rearward apertures being in communication with one of the passages such that each of the passages extends between one of the forward apertures and one of the rearward apertures on a said side of the cap; and a retaining assembly constructed with the cap for retaining eyeglasses on the cap, the retaining assembly comprises:

a pair of straps with each of the straps having:

a medial portion extending in one of the passages of the cap such that the medial portion is located in the interior of the cap between the inward perimeter band and the outward crown;

a first portion extending out of a said passage through the forward aperture formed in the crown such that the first portion extends through the forward aperture and out of the interior of the cap; and a second portion extending out of the said passage through the rearward aperture formed in the crown such that the second portion extends through the rearward aperture and out of the interior of the cap;

a first end on the first portion of the strap being configured for attaching to a temple member of the eyeglasses; and a second end on the second portion of the strap being attached to the second end of the other said strap; and eyeglasses having a front frame and a pair of temple members extending from the front frame, each of the temple members having a rear end portion opposite of the front frame, the first end of each of the straps being attached to one of the rear end portions of the temples;

wherein the system has an active configuration and an inactive configuration, the active configuration being characterized by the eyeglasses being worn on the face of the person with the first portions of the straps extending out of the forward apertures and to the temples of the eyeglasses at a location in the interior of the cap, the inactive configuration being characterized by the eyeglasses being rested on top of the visor of the cap with the first portions of the straps extending out of the forward apertures and to the temples of the eyeglasses at a location exterior of the cap.

* * * * *